Nov. 20, 1956 E. GRETENER 2,771,001
OPTICAL ILLUMINATION SYSTEM WITH HOMOGENEOUS
DISTRIBUTION OF LIGHT FOR PROJECTORS
Filed Sept. 29, 1952 4 Sheets-Sheet 1

INVENTOR
E. GRETENER
BY
Moore & Hall
ATTORNEYS

Nov. 20, 1956  E. GRETENER  2,771,001
OPTICAL ILLUMINATION SYSTEM WITH HOMOGENEOUS
DISTRIBUTION OF LIGHT FOR PROJECTORS
Filed Sept. 29, 1952  4 Sheets-Sheet 4

INVENTOR
E. GRETENER
BY Moore & Hall
ATTORNEYS

2,771,001

OPTICAL ILLUMINATION SYSTEM WITH HOMOGENEOUS DISTRIBUTION OF LIGHT FOR PROJECTORS

Edgar Gretener, Zurich, Switzerland

Continuation of application Serial No. 5,410, January 30, 1948, now Patent No. 2,624,234, dated January 6, 1953. This application September 29, 1952, Serial No. 312,119

10 Claims. (Cl. 88—24)

This application is a continuation of application Serial No. 5410 filed January 30, 1948, now Patent No. 2,624,234, dated January 6, 1953.

The present invention concerns illumination systems for producing homogeneous light distribution over a desired area.

One example of the use of the invention is the illumination of a film projector gate by an arc lamp source. It is the standard technique of the prior art to employ a combination of mirrors and lenses such that the image of the carbon arc or other source is formed either in the film gate or in the objective. Where the source image is formed in the film gate it is desirable that the portion of the main beam having the smallest cross-sectional area coincides with the film gate without shadowing. In this manner maximum efficiency may be obtained and there is no loss of light energy at the film gate edges. Where the light source image is formed in the film gate it is customary to use a film gate lens which forms an image of the exit pupil of the illuminating system at the diaphragm of the objective and of course focuses a sharp image of any foreign material it may have on its surface such as dirt upon the screen.

Heterogeneous distribution of light intensity over an area to be illuminated, e. g. a film projector gate, is caused in systems now generally employed by (a) inaccurate setting of the carbons, (b) displacement of the carbon arc from an optimum setting or (c) heterogeneous distribution of brilliancy over the light emanating surface of the light source.

Attempts have been made to overcome these disadvantages by using light concentrators or condensers the reflecting or refracting surfaces of which are composed of a plurality of concave mirrors or condenser lenses arranged to reflect or refract separate beams or rays emanating from the light source and to cause them to converge upon the area to be illuminated. With such means a plurality of images of the light source are in part superposed and in part juxtaposed in said area.

The reduction of the irregularities resulting from the above arrangement has not been satisfactory. Furthermore the arrangement is impractical because the use of a plurality of light condensers in the manner just described causes both considerable structural complication and difficulties in the correct alignment of the many light condenser parts.

The degree of homogeneity which can be obtained is further decreased where the optical system employed utilizes most of the light flux emanating from the source. Such systems employ concave mirrors or condenser lenses of large aperture which subtend a solid angle with respect to the light source which approaches ninety degrees.

As will be explained with reference to Fig. 1 the use of such large aperture light condensers causes heterogeneous illumination even when the light source is properly aligned and its radiating surface is of uniform luminosity or intensity. Such a prior art structure is shown schematically in Fig. 1 which indicates a cross section through a conventional elliptical mirror. The surface forms part of a regular ellipsoid and is a surface of revolution generated by rotating an ellipse about one of its axes. As the optical axis coincides with the axis of the ellipsoid the two focal points lie on the optical axis.

When a light source such as a carbon arc with edge portions such as 10 and 11 is positioned in the normal plane with respect to the axis of the first focal point of a reflector such as 12 on axis 13, an image of the light source is formed in the plane normal to the axis containing the second focal point which is farther away from reflector 12.

The heterogeneity of illumination in such an image is perhaps most easily understood with the help of partial beams, which may be thought of as emanating from the light source according to the classical rules of the geometry of optics. An elementary beam 14, the central ray of which is parallel to the optical axis 13 of mirror 12, may be regarded as possessing an angle sigma $m$. Angle sigma $m$ is bisected by the central ray of beam 14 and is formed by the two outer rays which originate at points 10 and 11, respectively, and converge to intersect the central ray at the surface of mirror 12. It will be seen that sigma $m$ is a maximum when the central ray coincides with axis 13 and is an inverse function of the angle p. s. i. which the central ray makes with axis 13. As p. s. i. approaches ninety degrees, sigma $m$ approaches zero.

These elementary beams spring from the incandescent surface of the light source and may be regarded as converging into a point on the reflecting surface of the mirror 12 where they are reflected by the mirror in such a way that all central rays coming from the first focal point of the mirror, i. e. the source, unite to form an image at the second focal point on the axis 13. The aperture angle of the beams, reflected from the surface of the mirror 12 corresponds to the angle sigma $m$ of the corresponding beam emanating from the light source.

With the decrease of the aperture angle of the elementary beams as the reflecting point moves to the outer zones of the surface of mirror 12, the area illuminated by such beams in the second focal plane is smaller than the area illuminated by elementary beams reflected by points on the inner zones. As a consequence the distribution of light in the plane of the image, which is the second focal plane, is heterogeneous even if the light source is properly aligned and is of uniform luminosity. Because of the concentration of illuminating beams in the vicinity of the axis 13 the distribution of light intensity in the plane of the image, or over the illuminated area, as shown in a lumen diagram exhibits a sharp peak in the center and rapidly decreases toward the outer zones of the image of the light source.

The above disadvantage may be reduced by employing a mirror with an aperture angle with respect to the light source of not more than sixty degrees. This reduction, however, considerably reduces the efficiency of the system and lowers the total light available for image production because of the loss of the light flux from the source filling the solid angle between sixty and ninety degrees.

On the other hand the use of a plurality of mirrors will not remove the above disadvantage which may be corrected only by limiting the angle to approximately sixty degrees. Above this value the effects discussed occur and satisfactory illuminating efficiency requires that the system receives the additional light from a wider angle than sixty degrees.

It is therefore an object of this invention to provide a homogeneous light distribution over a desired area with high efficiency and to correct or compensate for the heterogeneous light distribution by large apertural angle light condensers.

It is an object of the invention to provide means to control the elementary light beams from a light source in such a manner that in every meridional plane from the source to the first optical surface of the system the inner edge of each elementary beam passes through the edge zone of the illuminated area.

It is an object of the invention to provide means whereby the advantages of a film gate lens are achieved without the introduction of sharply focused shadows of dirt spots or the like.

It is an object of the invention to utilize all of the available light energy emanating from a source.

It is an object of the invention to provide means whereby the edge zone is decreased to the edge line of the illuminated area.

It is an object of the invention to provide a concave mirror having a surface formed by the revolution of a segment of a conic section. When the conic section segment has an eccentricity other than zero the principal axis of the segment is displaced from the optical axis of the system. In the special case where the conic segment has zero eccentricity and becomes a segment the hyperbolic lens of Fig. 2a could be replaced by a lens having two surfaces produced by rotation of offset circular curves having a cusp.

It is an object of the invention to provide an illuminating system having a concave mirror the generating line of which is represented by an ellipse arc whose axis is inclined to the optical axis of the system which represents the rotating axis for generating the mirror surface.

It is an object of the invention to provide an illuminating system having a concave mirror whose generation line represents a parabolic arc having its axis parallel to the optical axis.

It is an object of the invention to eliminate all shadowing of the illuminating beams by the diaphragm of the objective without using a film gate lens.

It is an object of the invention to provide an illumination system capable of attaining the above objects which is simple to produce, to operate and to service.

Those features which are novel and characteristic are set forth in the appended claims. The invention itself, however, as a practical structural embodiment both as to its organization and method of operation will best be understood by reference to the following description together with the accompanying drawing in which has been indicated diagrammatically an arrangement by which the invention may be practiced.

In the drawings like numbers refer to like parts throughout.

Figure 2:
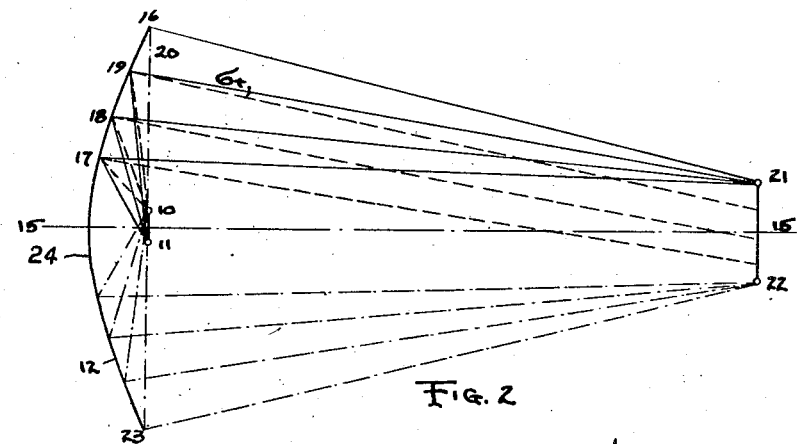
Fig. 2 is a sectional view of a schematic arrangement of elementary light beams.

One specific embodiment of the invention is shown in Fig. 2, which represents a meridional section through a concave mirror. The reflecting surface of the mirror is a symmetrical surface of revolution with respect to the optical axis 15—15 and is formed by an arc of an ellipse the main axis of which is inclined to the axis 15—15. Because of the inclination of the main elliptical axis the foci of the ellipse lie outside the optical axis and as a result they form two focal circles each in a plane perpendicular to the optical axis.

Figure 2A:
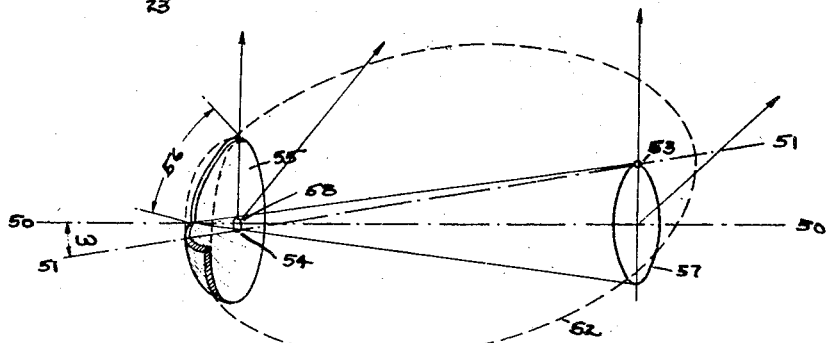
Fig. 2a is a schematic constructional diagram showing the geometry of the construction of a reflector according to the invention. Although an ellipse is shown in dotted lines it will be understood that it is representative of other conic sections such as a parabola or hyperbola.

As shown in Fig. 2a, the axis of rotation of the elliptical arc is the optical axis 50—50 to which the major axis 51—51 of the ellipse is inclined by angle omega. The foci 53 and 54 of the generating ellipse shown in dotted lines at 52 from the two circles 57 and 58, respectively, when ellipse 52 is rotated about optical axis 51—51 to form mirror 55 by the sweeping action of the solid portion 56 of ellipse 52. Part of mirror 55 has been removed to show the construction more clearly.

Fig. 2 shows a meridional section of a mirror 24 generated as shown in Fig. 2a, in which the main axis of the elliptic generating arc is inclined to axis 15—15 so that the foci of the ellipse lie on opposite sides of the axis 15—15. The surface of the mirror 24 produced by rotation of the elliptic arc around the optical axis 15—15 intersects with any meridional plane in two elliptic arcs 15—16 and 15—23. These arcs have a common point at their intersection with optical axis 15—15 which is a cusp, there being no common tangent at the intersection. The focal circles formed by rotation intersect with the plane of any meridional section in four separate points such as 10, 11 and 21, 22 respectively. It is for this reason that the reflector 24 is referred to as having four focal points in every meridional section. For the direction of inclination of the major axis of mirror 24 with respect to axis 15—15, the "focal points" 11 and 21 correspond to mirror segment 15—16 and the "focal points" 10 and 22 correspond to mirror segment 15—23.

It is an optical law of the ellipse that all the light rays coming from one focus which strike the ellipsoidal surface are reflected to the other focus.

As shown by the construction in Fig. 2, it follows that in the meridional plane there shown all rays originating at the first focal point 11 will converge on the second focal point 21, on the opposite side of optical axis 15—15 as shown in full lines. Likewise, all rays originating at the point 10 will converge on the point 22 as shown in dot-dash lines.

It further follows that if a circular light source, such as the positive crater of an electric arc, is located in the first or nearer focal plane of the mirror 24 so that the line 10—11 represents both the diameter of the arc crater and the diameter of the first focal circle, the corresponding "focal points" of every meridional section will lie on opposite points on the edges of the light source. Rays emanating from an edge point 11 of such a source will converge to a point 21 in the second focal plane where the film projector gate is preferably located. Elementary beams having as an origin or basis the full face 10—11 of the light source and uniting in the points 17, 18 and 19 of mirror 24 are reflected according to the invention so that they illuminate only the interior of the second focal circle.

From the above discussion it will be seen that because the envelope rays of such beams come from point 11 and converge on point 21 on the edge of the circle in the second focal plane, more light from such beams is concentrated in the vicinity of the circumference of the circle than near its center. That is the level of light distribution by beams projected from the upper section 15—16 will have a peak near the circumference. However, the distribution of light over the same area from the lower section 15—23 is reversed and as these groups of beams are superimposed the peak of one falls in the valley of the other and the resultant light level over the film gate area is even within allowable tolerances because the individual curves are not critical and can be made to match quite well.

Figure 1:
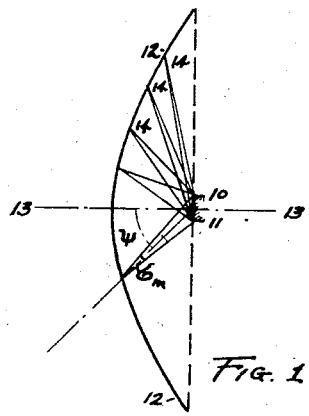
Fig. 1 is a sectional diagrammatic sketch of the relation between a light source, reflector and elementary beams.
Figure 3:
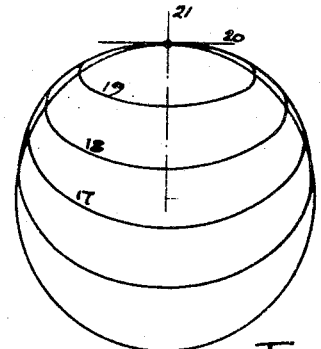
Fig. 3 is another schematic showing of elementary light beam distribution.

Fig. 3 is a diagrammatic representation of the distribution of light that would be produced in the second focal plane by an infinitesimally narrow strip cut from the mirror 24 along the upper section 15—16. As the width of this section approaches zero the ellipses 17, 18, 19 and 20 may be taken as representing images of the circular light source as projected onto the second focal plane by the light beams 17, 18, 19 and 20 of Fig. 2. Because of the decrease in the angle sigma $m$ of the beams reflected by the outer zones of mirror 24, the images of the circular light source are distorted into ellipses having a common point of tangency 21. Point 21 is the intersection of top of the second focal circle with the plane of the curve of the section 15—16 of mirror 24. As mirror 24 may be regarded as a surface of revolution and therefore symmetrical about its optical axis 15—15, a very large number of such elliptical images are superposed ensuring a practically even distribution of light over the film gate area.

In Figs. 2 and 2a, the axis 51—51 of the generating ellipse is inclined to the optical axis 50—50 or 15—15 with the result that the first focal point 54 of the ellipse 52 lies on the opposite side of the axis of rotation 50—50 as the generating arc 56 and the second focal point 53 lies on the same side of axis 50—50 as does the arc 56. Where the reverse is true the mirror sections and "focal points" in any meridional section will be conjugate in the inverse sense.

Figure 4:
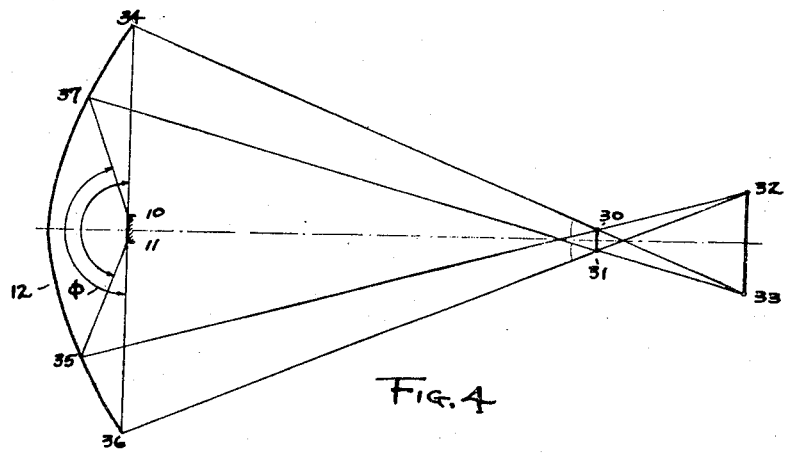
Fig. 4 is a schematic ray diagram of one form of the invention.

Fig. 4 represents an example of a mirror with such inverse correspondence of mirror section and "focal points." Rays originating from a source at a first focal point 10 will be reflected by the upper section of the mirror 80 and converges in a second focal point 33 after passing through a film gate 30—31. In the same way rays from the lower section of mirror 80 converge on point 32.

A light source such as a carbon arc has edge portions 10 and 11 positioned at a focus of reflector 12 on its axis 13. Elementary beams 14 emanate from the face 10, 11 of the source which may be taken as normal to the optical axis 13. That beam 14 which is parallel to the optical axis 13 radiates maximum energy from the face 10, 11 and the beam 14 normal to the optical axis 13 radiates zero energy. The light energy radiated by any given beam 14 is a function of the meridional aperture angle sigma $m$ which is an inverse function of the inclination angle psi between the optical axis 13 and the central ray of a selected elementary beam 14. The tangential angle sigma $t$ is also an inverse function of the inclination angle psi. It will appear that where homogeneity of the illuminated field is a desideratum the size of reflector 12 should be such that the angle of inclination psi should be less than ninety degrees. Where the source image is formed in a film gate in actual practice the angle psi of the first optical surface is limited to a value which should not be greater than about sixty degrees. The present system directs the elementary beams 14 so as to yield a homogeneous distribution of light over the film gate area. Only in this way can proper light valves corresponding to the relative translucence of the negative be obtained on a screen or other illuminated surface.

In Fig. 2 may be seen a source 10, 11 normal to optical axis 15—15 of a mirror 12. A number of elemental beams 14 having increasing inclination angles psi are indicated by 17, 18, 19 and 20. All of the elemental rays emanating from the edge 11 of the source to the upper arch between points 15—16 of mirror 12 are concentrated at the opposite edge 21 of film gate 21, 22. Rays coming from any other points on the source and reflected by arc 15, 16 of mirror 12 are directed toward the inner part of the film gate 21, 22 relative to edge 21. The rays 17, 18, 19 shown in solid lines as emanating from point 11 are termed inner edge rays as they are nearer the principal optical axis 15.

Fig. 3 shows an edge concentration effect produced by the reflection of elementary beams 17, 18, 19 and 20 by mirror 12. The meridian or section 15—16 of mirror 12 is an arc of an ellipse having one focus at point 11 of the source and the other focus at edge 21 of the film gate. For convenience the points discussed may be thought of as lying in the plane of the paper. The lower meridian or elliptical arc 15—23 has its focal points at 10 and 22. The elliptical arc 16—23 is symmetrical about optical axis 15—15. The elementary beams 17, 18, 19 and 20 have fronts which converge in circles having an edge at 21.

The circles of confusion 19, 18, 17 are tangent at edge 21, overlap each other and progressively increase in diameter.

In Fig. 4 points 30 and 31 may be taken as edge points of a film gate or the like and points 32 and 33 represent the diaphragm which determines the aperture of the objective lens. The point 30 will contain rays from 34 and 35 reflected from the source by mirror 12 and may be regarded as illuminated by elementary beams from the angle theta. The point 31 contains rays from 36 and 37 and may be regarded as illuminated by elementary beams from the angle $\phi$. From the previous discussion it follows that elemental rays from points other than 10 and 11 fall nearer the center of the film gate than points 30 and 31. As a result there is no shadow effected at diaphragm 32, 33.

The plane in which such a diaphragm may be inserted depends upon the mutual correspondence of mirror sections and focal points discussed above. In Fig. 4 the plane of film gate 30—31 lies between the first and second focal planes. In Fig. 2 the plane of such a gate will lie beyond the second focal plane in the direction of light flux.

Figure 5:
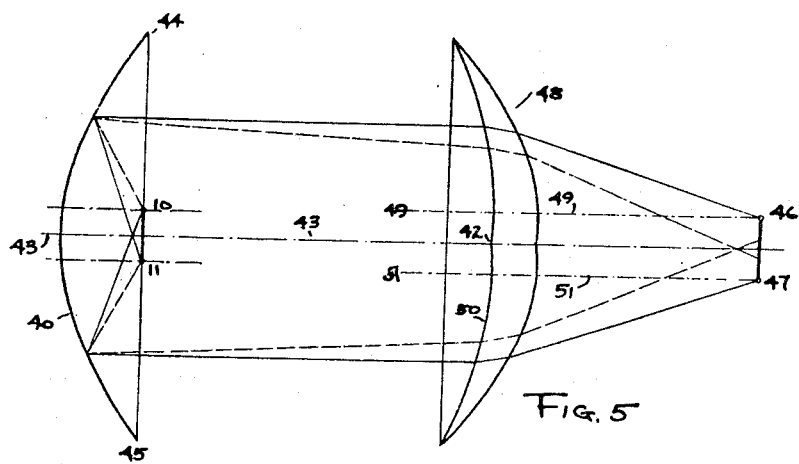
Fig. 5 is a schematic ray diagram of a modified form of the invention.
Figure 6:
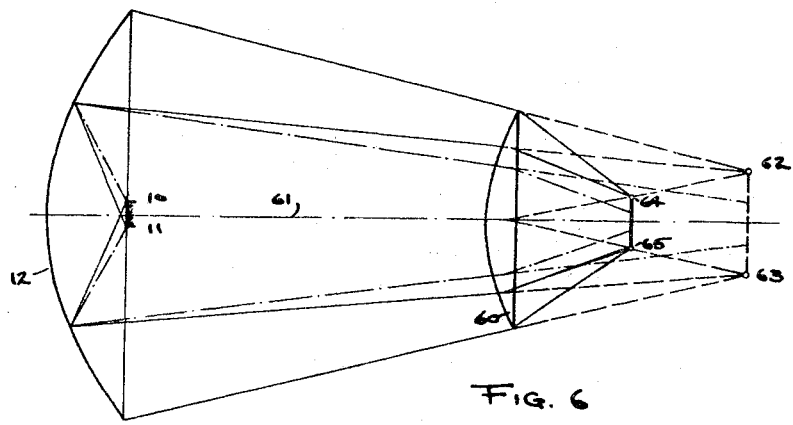
Fig. 6 is a schematic ray diagram of another form of the invention.
Figure 7:
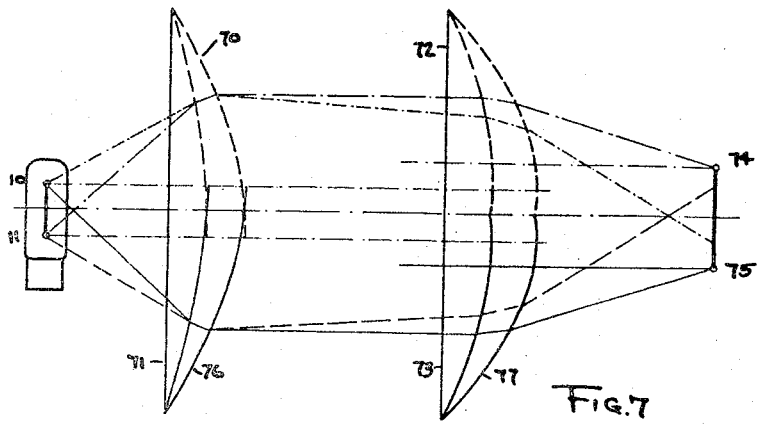
Fig. 7 is a schematic ray diagram of still another form of the invention illustrating an illumination system utilizing the invention.

If it should be desired to use a long positive carbon in the arc lamp constituting source 10, 11 film gate 30, 31 must be positioned a substantial distance from source 10, 11. In these circumstances it is desirable to utilize a telecentric system which does not require a reflector 12 with a very large diameter. As shown in Fig. 5 a concave mirror 40 is combined optically with a converging meniscus 41 which in this case is a special construction of converging concavo-convex having a cusp 42. Cusp 42 is shown as a point, but may be a line if desired. Mirror 40 and special meniscus 41 have as their optical axes the same line 43. The upper meridian or section 44 of mirror 40 is determined by a parabolic arc 49, having its axis 48 parallel with axis 43 and its focal point positioned at point 11 of the source. The lower meridian or section 45 is symmetrical with respect to axis 43 and has its focal point positioned at 10. Mirror 40 is generated as a surface of revolution by rotating the parabolic arc 49 about axis 43. From the properties of a paraboloid it follows that all rays emanating from point 11 are reflected parallel to axis 43 by upper arc 44, and that all rays from point 10 will be reflected parallel to axis 43 by arc 45. Intermediate rays will deviate as shown. To obtain the desired effect at film gate 46, 47 elemental beams from point 11 should be focused at point 46 and beams from point 10 should be focused at point 47. This is accomplished by hyperbolic meniscus 41. Lens 41 is so constructed that the upper meridional section 148 above the optical axis 43 of the system has its individual optical axis 149 parallel to principal axis 43 and passing through point 46. Lower meridional section 150 below principal optical axis 43 has its individual axis 151 also parallel to axis 43 and passing through point 47 of the film gate. Edge 46 of the film gate contains the focal point of upper limb 148 of special hyperbolic meniscus 41 and edge 147 contains the focal point of the lower limb. The arrangement is the optical equivalent of the structure of Fig. 4.

Where it is necessary or desirable to reduce the diameter of the lens 41 as in the case of projectors having a large illuminating aperture or objective, the arrangement shown in Fig. 6 may be used. Light from source 10, 11 is reflected by mirror 12 towards film gate 62, 63. A plano convex lens 60 is positioned on the optical axis 61 between the source 10, 11 and film gate 62, 63 with its convex side toward the source 10, 11. Film gate 62, 63 corresponds to film gate 21, 22 of Fig. 2. Plano convex lens 60 optically transforms film gate 62, 63 to the reduced area 64, 65 and increases the illuminating aperture of the gate at the same time.

Where desired a double meniscus may be used as shown in Fig. 7. This arrangement may be termed a pure condenser lens system and has its principal application in now-professional uses where substandard film is projected by incandescent lamps. As described in the structure of Fig. 5, the upper meridional section 70 of hyperbolic meniscus 71 has its focal point at 11 of source 10, 11 and the focal point of the upper meridional section 72 of cusped meniscus 73 is at 74 of film gate 74, 75. In the same manner the lower meridional section 76 of meniscus 73 has its focal point at 75 of film gate 74, 75.

As previously indicated the illumination system constructed according to the invention operates with maximum efficiency when the smallest cross-sectional area of the illuminating beam or light cone corresponds in size and shape with the area of the film gate. With an optical system embodying the invention there is neither a sharp nor a blurred image of the light source in the plane of the film gate, every concentration of center rays of the elementary beams in the gate being avoided. The individual circles of confusion of the elementary beams have substantial diameters at the plane of the film gate. As there is no image of the light source in the plane of the film gate an uneven distribution of brilliancy over the source area will not produce a corresponding uneven gate illumination. This advantage is of especial importance where incandescent lamps are employed as a light source as the invention prevents an image of the filament from being projected on the screen.

Another advantage of the invention is that the improvement in projection and the like is obtained in a large measure if only a limited concentration of the edge rays of the source near the edge of the film gate is used. It is not dependent upon the projection of the edge of the light source to the opposite edge of the film gate. It has been found in practice that the edge zone in the film gate can be located between the edge line of the gate to half the distance from the edge line to the center of the gate. The edge zone may be regarded as including the area half way to the center from the edge lines. The analysis is valid for every meridional section whether the area to be illuminated is a circle, square or rectangle.

The mirrors referred to above which are used in practicing the invention may be readily produced by machines and tools now used in making regular or ordinary concave mirrors. The adjustment of the mirror with respect to the light source is quite simple and easily maintained.

Figure 5A:
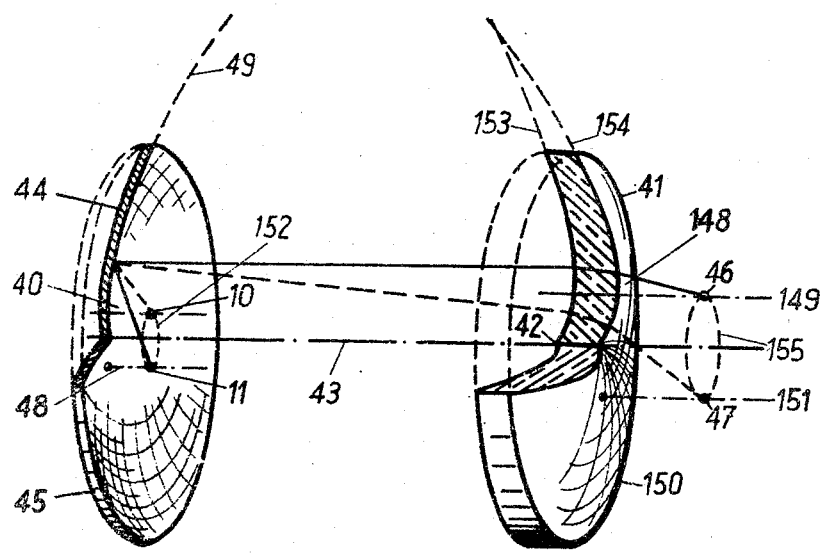
Fig. 5a is a schematic constructional diagram showing the geometry of the construction of the arrangement according to the invention shown by Fig. 5 and explaining the forming of the surface of the elements thereof.

Fig. 5a shows a schematic constructional representation of the arrangement of Fig. 5, identical elements being referred to by identical numerals. As was mentioned above the arrangement of Fig. 5 comprises a concave mirror 40 and a meniscus lens 41. The reflecting surface of mirror 40 is obtained by rotating a parabolic arc 49 around the optical axis 43 of the system. The axis 48 of the arc does not coincide with the axis of rotation, i. e. with the optical axis 43, but is displaced downwards. In contradistinction to the arrangement shown by Fig. 2 the axis 48 is parallel to axis 43. The focal point of the parabolic arc thus produces a focal circle 152. This focal circle will intersect with each meridional section through the mirror in two points, e. g. points 10 and 11. The meniscus lens 41 is obtained by a similar process by rotating hyperbolic arcs 153 and 154 around axis 43. The common axis 149 of these arcs is likewise parallel to axis 43 but displaced in opposite direction with respect to axis 48, i. e. upwards. The focus to the right of these hyperbolic arcs likewise produces a focal circle 155 which again intersects with meridional sections in two points, e. g. 46 and 47. Due to the well known laws of geometry and geometrical optics a light ray issuing from a focal point of the parabolic arc, e. g. 11, will be reflected by the appertaining upper arc to be parallel with the axis 48. This parallel ray will be deflected by the upper half of the lens 41 to pass through the appertaining focal point, i. e. 46. The same holds good for a ray issuing from point 10 which is reflected by the lower halves of mirror 40 and lens 41 and passes through the local point 47. If now according to the invention a compact light source is so arranged that it substantially fills the first focal circle 152, the entire light beam impinging upon mirror 40 will pass through the second focal circle 155 in such a manner that the distribution of intensity over that second circle is substantially homogeneous. If the object to be illuminated, e. g. the picture aperture to a projector is located at the plane of the second focal circle so that it is circumscribed thereby, homogeneous illumination thereof will result.

A conic section may be defined as a curve obtained by the intersection of a right circular cone by a plane. It may also be defined as the locus of a point which moves in a plane so that its distance from a fixed point, called the focus, is in a constant ratio, called the eccentricity, to its distance from a fixed straight line known as the directrix. In "true" conic section curves the eccentricity has a finite value, viz. smaller than unity for the ellipse, unity for the parabola and greater than unity for the hyperbola. The eccentricity of a circle is zero.

I claim:

1. In an optical system, a compact light source having a substantial area located substantially on the optical axis of the system, an area to be illuminated, a concave reflecting light condensing means having a surface formed by the revolution of a segment of a conic section having an eccentricity other than zero so positioned that the principal axis of the conic section is displaced from the axis of rotation of the system, said light condensing means having a focal area corresponding roughly to the light emitting area of said source and acting to direct the elementary light beams originating in said source and impinging on said reflecting surface toward said area to be illuminated to form overlapping circles of confusion yielding uniform high efficiency illumination.

2. The combination set forth in claim 1, said displaced principal axis being disposed parallel to said optical axis.

3. The combination set forth in claim 2, said light source being a carbon arc, said circles of confusion having diameters sufficiently large so that no recognizable image of the light source appears on said illuminated area.

4. In a optical system, a compact light source having a substantial area located substantially on the optical axis of the system, an area to be illuminated, a concave reflecting light condensing means having a surface formed by the revolution of a segment of a conic section about the optical axis of the system, said section being so positioned that the principal axis of the generating section is displaced but substantially parallel to the optical axis of the system, said reflecting means having a focal area of the same order of magnitude as the area of said source, said focal area being closely adjacent to the light emitting surface of said source and acting to direct the elementary light beams from the source along the axis, a converging light condensing lens means having surfaces formed by the revolution of a segment of a conic section about the optical axis of the system, said section being so positioned that the principal axis of the generating section is displaced but substantially parallel to the optical axis of the system, said light condensing means projecting light to the area to be illuminated.

5. The combination set forth in claim 4, said light condensing lens means comprising a meniscus lens, said light source being a carbon arc.

6. The combination set forth in claim 5, said meniscus lens having a cusp.

7. The combination set forth in claim 4, said conic section being a parabolic section.

8. The combination set forth in claim 4, said conic section being an hyperbolic section.

9. In an optical system, a compact light source having a substantial area located substantially on the axis of rotation of the system, an area to be illuminated, at least one concave light condensing means, having at least one surface formed by the revolution of a segment of a conic section having an eccentricity other than zero so positioned that the principal axis of the conic section is displaced from the axis of rotation of the system, said light condensing means having a focal area corresponding roughly to the light emitting area of said source and acting to direct the elementary light beams originating in said source and impinging on said reflecting surface toward said area to be illuminated to form overlapping circles of confusion yielding uniform high efficiency illumination.

10. The combination set forth in claim 4, in which the conic sections of said reflecting condensing means are parabolic sections, and the conic sections of said converging light condensing lens means are hyperbolic sections.

References Cited in the file of this patent

UNITED STATES PATENTS

| | | |
|---|---|---|
| 2,192,886 | Bergmans | Mar. 12, 1940 |
| 2,216,993 | Von Wedel | Oct. 8, 1940 |
| 2,225,485 | Rantsch | Dec. 17, 1940 |
| 2,496,675 | Pasquet | Feb. 7, 1950 |
| 2,624,234 | Gretener | Jan. 6, 1953 |

OTHER REFERENCES

Scientific American, March 16, 1918, "Doing away with the arc", pages 1 and 2.